(12) United States Patent
Cox et al.

(10) Patent No.: US 11,383,630 B2
(45) Date of Patent: Jul. 12, 2022

(54) HOOK-LIFT HOIST

(71) Applicant: Wilian Holding Co., Des Moines, IA (US)

(72) Inventors: Evan Cox, Des Moines, IA (US); Thomas Waldschmitt, Ankeny, IA (US)

(73) Assignee: Wilian Holding Co., Des Moines, IA (US)

( * ) Notice: Subject to any disclaimer, the term of this patent is extended or adjusted under 35 U.S.C. 154(b) by 187 days.

(21) Appl. No.: 16/804,328

(22) Filed: Feb. 28, 2020

(65) Prior Publication Data

US 2020/0276925 A1 Sep. 3, 2020

Related U.S. Application Data

(60) Provisional application No. 62/812,408, filed on Mar. 1, 2019.

(51) Int. Cl.
*B60P 1/28* (2006.01)
*B60P 1/16* (2006.01)

(52) U.S. Cl.
CPC .............. *B60P 1/283* (2013.01); *B60P 1/162* (2013.01)

(58) Field of Classification Search
CPC .................. B60P 7/08; B60P 1/48; B60P 1/64
USPC ...... 298/22 r, 1 b, 12, 8 t, 8 r; 414/491, 549, 414/421, 489, 477, 563
See application file for complete search history.

(56) References Cited

U.S. PATENT DOCUMENTS

| | | | |
|---|---|---|---|
| 5,597,281 A | 1/1997 | Croiset et al. | |
| 6,158,947 A * | 12/2000 | Goiran .................. | B60P 1/6463 414/491 |
| 6,406,247 B1 * | 6/2002 | Ghiretti ................. | B60P 1/6463 414/457 |
| 7,341,419 B1 * | 3/2008 | Fink ...................... | B60P 1/6463 414/448 |
| 9,227,546 B2 * | 1/2016 | Marmur ................ | B60P 1/48 |
| 10,131,264 B2 * | 11/2018 | Sailer ................... | B60P 1/6463 |
| 10,377,292 B2 * | 8/2019 | Downing .............. | B60P 1/16 |

OTHER PUBLICATIONS

Edbro, "Edbro Brochure".

* cited by examiner

*Primary Examiner* — D Glenn Dayoan
*Assistant Examiner* — Sunsurraye Westbrook
(74) *Attorney, Agent, or Firm* — Matthew Warner-Blankenship; Dentons Davis Brown, P.C.

(57) ABSTRACT

Disclosed herein is a hoist apparatus having a base frame, an arm, a hydraulic lift cylinder, and a contact fulcrum attached to the base frame. The arm has a base segment rotatably coupled to the base frame at a first joint, a middle segment rotatably coupled to the base segment at a second joint, and a coupling segment extendably coupled to the middle segment at a second arm joint, the coupling segment comprising a hook at a distal end of the coupling segment. The hydraulic lift cylinder is rotatably coupled at a first end to the base frame and rotatably coupled at a second end to the middle segment. In certain embodiments, the middle segment is contactable with the contact fulcrum during operation of the arm. Various implementations provide for a hoist apparatus that is disposable on a vehicle.

22 Claims, 7 Drawing Sheets

HOOK-LIFT HOIST

CROSS-REFERENCE TO RELATED APPLICATION

This application claims the benefit under 35 U.S.C. § 119(e) to U.S. Provisional Application 62/812,408, filed Mar. 1, 2019 and entitled "Hook-Lift Hoist," which is hereby incorporated herein by reference in its entirety.

FIELD

The various embodiments herein relate to hook-lift hoists mounted on various types of vehicles for loading and unloading detachable containers.

BACKGROUND

Hook-lift hoists have been in common use, particularly in European countries, for a number of years. The hoist typically has a pivotable L-shaped arm with a hook on its distal end portion or jib that is used to engage a detachable truck box. The hook of the jib engages a loading bar of the container or truck box and the arm is pivoted to lift the container onto the chassis for transport of the container and its contents to any location.

The truck box containers are manufactured in a range of sizes, each having a characteristic size and rated weight capacity. In general, the larger the container, the larger its rated weight capacity. In the past, hoists have generally been engineered to have a loading capacity matched to the maximum loaded weight of the container it can load and transport.

It has become known also to provide the truck chassis with a lift mechanism for tilting of the box atop the chassis to dump the contents of the box rearwardly of the truck. Hook-lift hoists allow for a single truck chassis to be used with a wide variety of truck boxes, each of which has a distinct and advantageous use. A single truck chassis with a hook-lift hoist can be used, for example, to load, transport and dump open-topped waste receptacles to a disposal site; to load, transport, and unload shipping containers; to mount, use, and dismount road maintenance equipment, such as a salt spreader; to load, transport, and unload wheeled equipment; and so on. This functional versatility makes hook-lift hoists an economical vehicle for transport industries, particularly the street and highway maintenance departments of municipalities, states, and other governmental entities where budgetary constraints and the variety of tasks that must be performed make these multi-purpose vehicles an attractive choice.

There is a need in the art for an improved hook-lift hoist, including a hoist having a single cylinder with increased lift capacity.

BRIEF SUMMARY

Discussed herein are various hoist apparatus embodiments, some of which can be disposed on various types of vehicles. Certain embodiments have a base frame, an arm rotatably coupled to the base frame, a hydraulic cylinder coupled to the arm and the base frame, and a contact fulcrum attached to the base frame. In some implementations, the contact fulcrum reduces the amount of force required from the hydraulic lift cylinder during operation of the arm. In further embodiments, concurrent rotation around first and second joints of the arm occurs at the same time during movement of the arm between a retracted position and an extended position.

In Example 1, a hoist apparatus comprises a base frame and an arm comprising a base segment rotatably coupled to the base frame at a first joint, a middle segment rotatably coupled to the base segment at a second joint, and coupling segment extendably coupled to the middle segment at a second arm joint, the coupling segment comprising a hook at a distal end of the coupling segment. The hoist apparatus further comprises a hydraulic lift cylinder rotatably coupled at a first end to the base frame and rotatably coupled at a second end to the middle segment and a contact fulcrum attached to the base frame, wherein the middle segment is contactable with the contact fulcrum during operation of the arm.

Example 2 relates to the hoist apparatus according to Example 1, wherein the contact fulcrum reduces the amount of force required from the hydraulic lift cylinder during operation of the arm.

Example 3 relates to the hoist apparatus according to Example 1, wherein the main frame comprises a cross member, wherein the contact fulcrum is disposed on the cross member.

Example 4 relates to the hoist apparatus according to Example 3, wherein base segment is contactable with the cross member during operation of the arm.

Example 5 relates to the hoist apparatus according to Example 1, wherein concurrent rotation around both the first and second joints occurs at the same time during movement of the arm between a retracted position and an extended position.

In Example 6, a hoist apparatus comprises a base frame and an arm comprising a base segment rotatably coupled to the base frame at a first joint, a middle segment rotatably coupled to the base segment at a second joint, and coupling segment extendably coupled to the middle segment at a second arm joint, the coupling segment comprising a hook at a distal end of the coupling segment. The hoist apparatus further comprises a first hydraulic cylinder rotatably coupled at a first end to the base frame and rotatably coupled at a second end to the middle segment, a contact fulcrum attached to the base frame, a retracted arm position in which the middle segment is disposed adjacent to and parallel with the base frame, and an extended arm position in which the middle segment and the coupling segment are at least partially disposed proximal of a proximal end of the base frame, wherein the middle segment is contactable with the contact fulcrum during movement of the arm between the retracted arm and extended arm positions.

Example 7 relates to the hoist apparatus according to Example 6, wherein the base frame is disposed on a wheeled chassis.

Example 8 relates to the hoist apparatus according to Example 6, wherein the main frame comprises a cross member, wherein the contact fulcrum is disposed on the cross member.

Example 9 relates to the hoist apparatus according to Example 8, wherein base segment is disposed against the cross member in the retracted arm position.

Example 10 relates to the hoist apparatus according to Example 6, wherein the contact fulcrum comprises a base structure coupled to the main frame, and a contact structure coupled to the base structure.

Example 11 relates to the hoist apparatus according to Example 10, wherein the middle segment is contactable with the contact structure during movement of the arm between the retracted arm and extended arm positions.

Example 12 relates to the hoist apparatus according to Example 6, further comprising at least one second hydraulic cylinder operably coupled at a first end to the middle segment and operably coupled at a second end to the coupling segment, wherein the coupling segment is slidable between a retracted coupling segment position and an extended coupling segment position.

Example 13 relates to the hoist apparatus according to Example 6, wherein the contact fulcrum reduces the amount of force required from the first hydraulic cylinder during movement of the arm between the retracted arm and extended arm positions.

Example 14 relates to the hoist apparatus according to Example 6, wherein concurrent rotation around both the first and second joints occurs at the same time during at least a portion of the movement of the arm between the retracted arm and extended arm positions.

In Example 15, a hoist apparatus comprises a base frame comprising a cross member and an arm comprising a base segment rotatably coupled to the base frame at a first joint, a middle segment rotatably coupled to the base segment at a second joint, and coupling segment extendably coupled to the middle segment at a second arm joint, the coupling segment comprising a hook at a distal end of the coupling segment. The hoist apparatus further comprises a first hydraulic cylinder rotatably coupled at a first end to the base frame and rotatably coupled at a second end to the middle segment, a contact fulcrum attached to the cross member, a retracted arm position in which the middle segment is disposed adjacent to and parallel with the base frame, an intermediate arm position in which the middle segment is disposed in contact with the contact fulcrum, and an extended arm position in which the middle segment and the coupling segment are at least partially disposed proximal of a proximal end of the base frame.

Example 16 relates to the hoist apparatus according to Example 15, wherein the middle segment comprises a pair of elongate tubes.

Example 17 relates to the hoist apparatus according to Example 15, wherein the contact fulcrum comprises a base structure coupled to the cross member, and a contact structure coupled to the base structure.

Example 18 relates to the hoist apparatus according to Example 17, wherein the middle segment is disposed in contact with the contact structure in the intermediate arm position.

Example 19 relates to the hoist apparatus according to Example 15, further comprising at least one second hydraulic cylinder operably coupled at a first end to the middle segment and operably coupled at a second end to the coupling segment, wherein the coupling segment is slidable between a retracted coupling segment position and an extended coupling segment position.

Example 20 relates to the hoist apparatus according to Example 15, wherein concurrent rotation around both the first and second joints occurs at the same time during at least a portion of the movement of the arm between the retracted arm and extended arm positions.

Example 21 relates to the hoist apparatus according to Example 15, wherein the contact fulcrum reduces the amount of force required from the first hydraulic cylinder during movement of the arm between the retracted arm and extended arm positions.

Example 22 relates to the hoist apparatus according to Example 15, further comprising first and second contact pads disposed at a distal end of the base frame, wherein the first and second contact pads are sized and shaped to receive the coupling segment.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

The various embodiments herein relate to a hook-lift hoist that has an arrangement of pivot points and a fulcrum that allows for the use of a single lift cylinder by reducing the required lift cylinder strength for a given load or lift capacity. Certain implementations further include a slidable jib that is mounted for forward and rearward sliding movement inside a pair of tubes that are part of the hook lift arm. Additional embodiments include contact or stabilization pads on the frame of the hoist that can receive the jib member to provide additional stability. It is understood that any embodiment herein can include any combination of the above features/structures.

Figure 1:
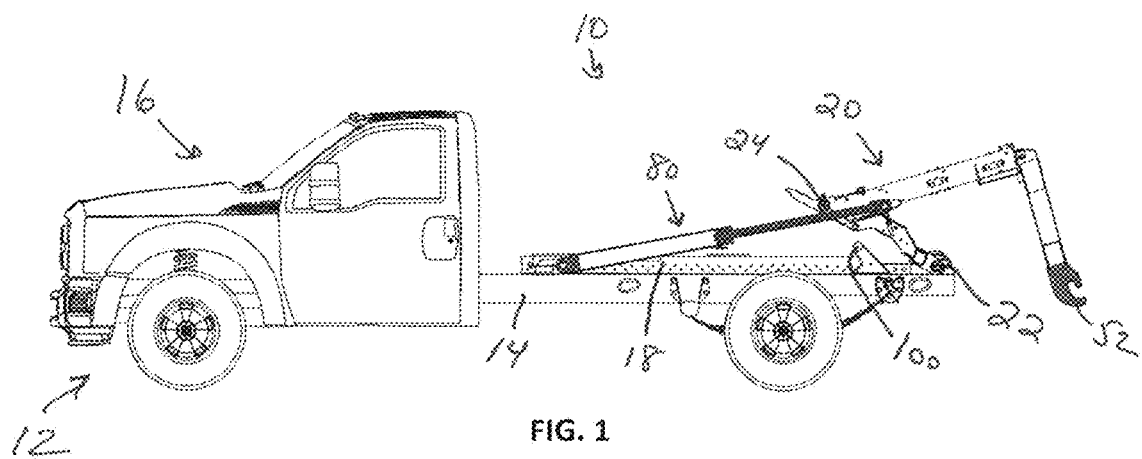
FIG. 1 is a side view of a hoist apparatus disposed on a truck and further disposed in the extended or loading position, according to one embodiment.

FIG. 1 depicts one embodiment of a hook-lift hoist that is mounted on a truck 12 having a chassis 14 and cab 16. The hook-lift hoist 10 can be used to load and unload objects on the truck 12 and, if desired, to tilt the loaded object for dumping of its contents. Any known objects for transporting on a truck (such as truck 12) can be loaded/unloaded by the hoist 10, such as containers, equipment, and the like. It is understood that the hoist 10 can be mounted on any chassis of any vehicle for use in loading and unloading objects thereon.

The hook-lift hoist 10 in accordance with certain implementations includes a base frame (also referred to herein as a "mainframe" or "frame") 18 that is secured to the chassis 14 rearwardly of the cab 16 by any known attachment mechanisms. The hoist 10 has an articulated arm (also referred to herein as a "hook-lift arm") 20 that is pivotally mounted to the mainframe 18 for pivotal movement about a pair of horizontal axes: horizontal axis 22 and horizontal axis 24, both of which are transverse to the mainframe 18. An exemplary container that can be engaged by the arm 20 and pulled onto the hoist 10 is shown in use with a known prior hoist, which is commercially available as Model SL-180 from SwapLoader USA, Ltd. and is disclosed in U.S. Pat. No. 5,601,393, which is hereby incorporated herein by reference in its entirety. The general operation of a hook-lift hoist such as the hoist 10 according to the various embodiments disclosed herein is well known in the art and may be exemplified by the apparatus and operation described in the '393 patent. Further, the known hook-lift hoist disclosed therein can be altered to incorporate features of the embodiments herein, according to one implementation.

Figure 2A:
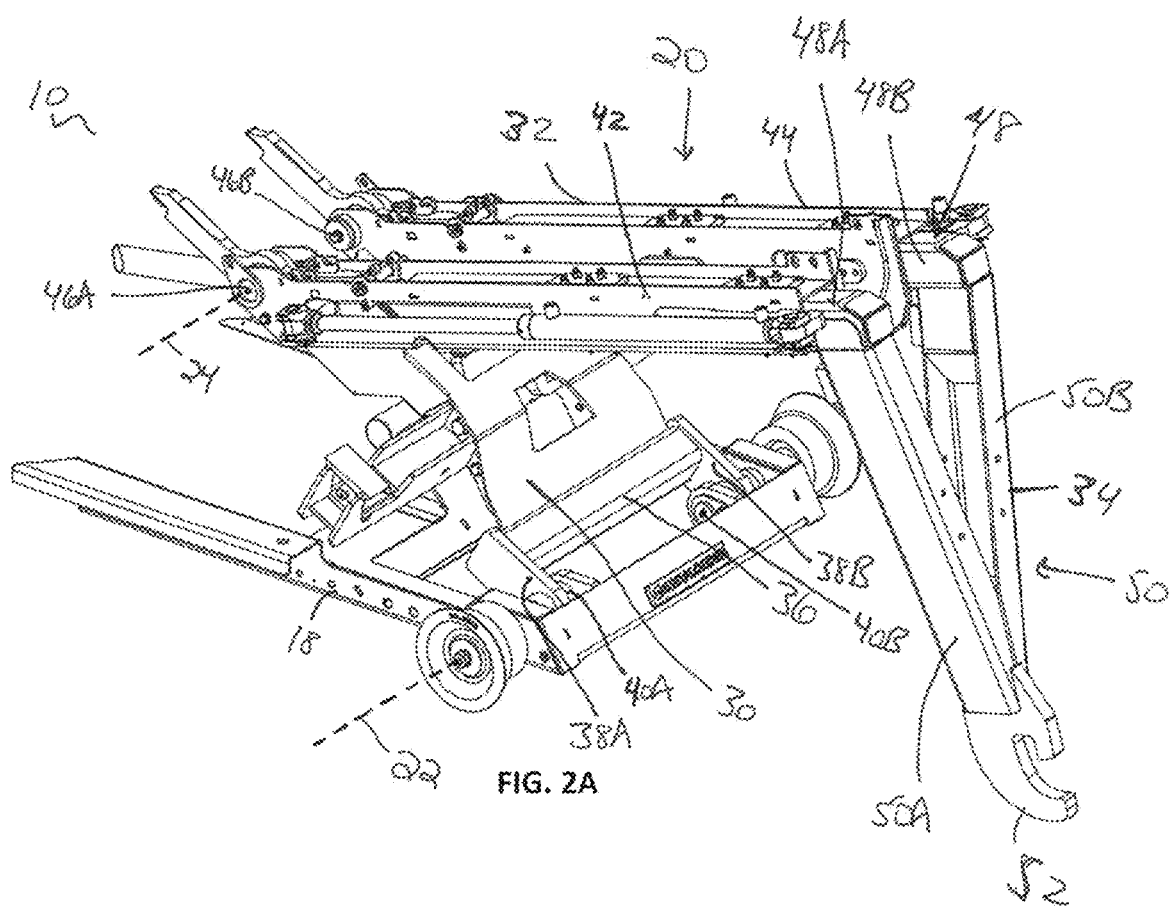
FIG. 2A is a rear perspective view of a hoist apparatus wherein the arm is disposed between the retracted and extended positions, according to one embodiment.
Figure 2B:
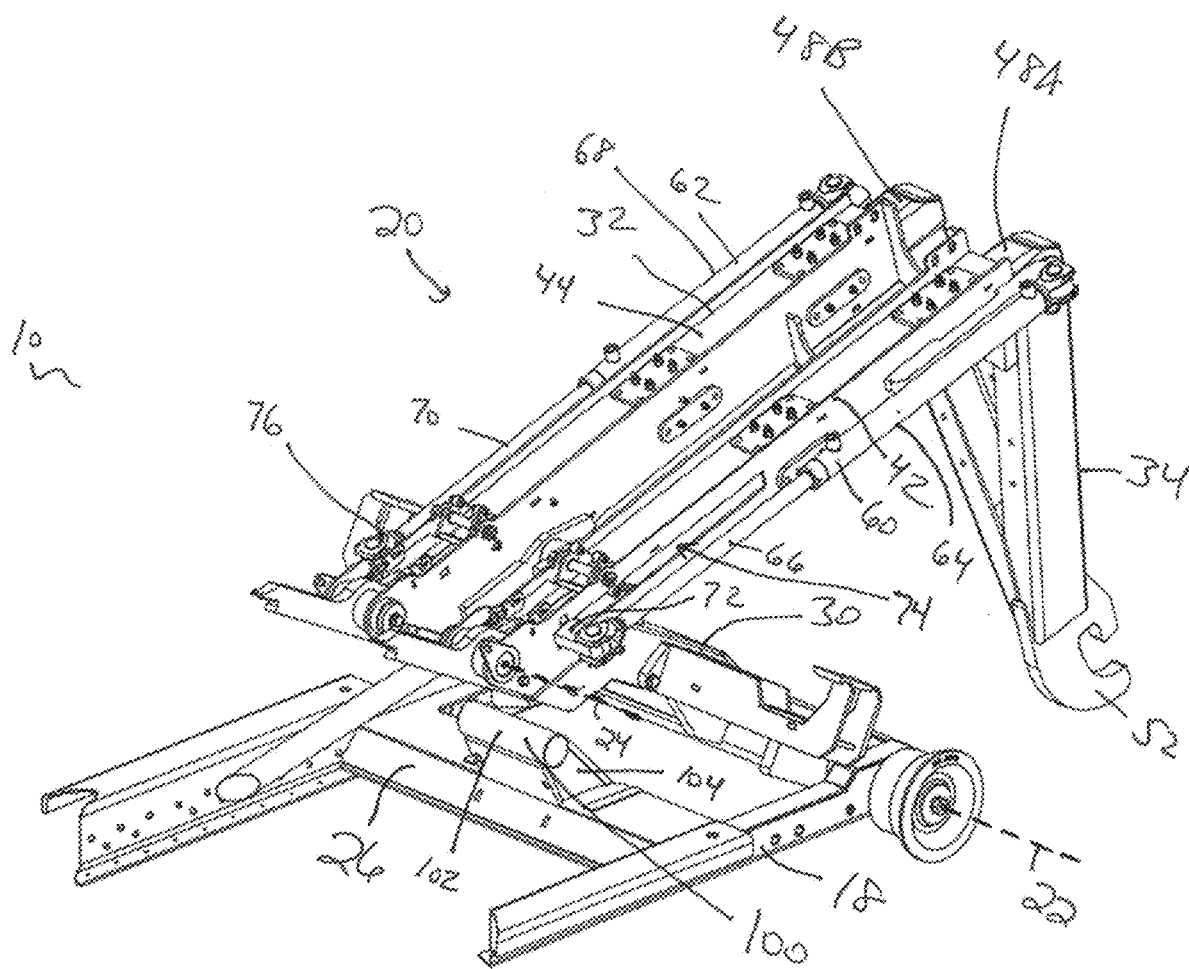
FIG. 2B is a front perspective view of the hoist apparatus of FIG. 2A, according to one embodiment.

FIG. 2A-2D provide various views of the hoist 10, including the arm 20, according to one embodiment. FIGS. 2A and 2B depict perspective views of the main components of the arm 20. The arm 20 has three segments: a base (also referred to herein as "inner" or "rearward") segment 30, a middle segment 32, and a coupling member (also referred to herein as a "jib member") 34. As best shown in FIG. 2A, the base segment 30 includes a frame 36 with a pair of parallel side arms 38A, 38B that pivotally couple the base segment 30 to the mainframe 18 via a pair of pins 40A, 40B for pivotal movement about the horizontal transverse axis 22. The middle segment 32 includes a pair of parallel, longitudinally extended tubes (also referred to herein as "legs") 42, 44 that are pivotally coupled to the base segment 30 via a pair of pins 46A, 46B for pivotal movement around the horizontal transverse axis 24. The jib member 34 is L-shaped in longitudinal cross-section and has a first leg section 48 and a second leg section 50 such that the two leg sections 48, 50 are coupled to each other to form the "L" shape. The first leg section 48 is made up of two extendable legs 48A, 48B that are received for telescoping movement inside the elongate tubes 42, 44 of the middle segment 32 between a retracted position and an extended position. It is understood that the two elongate members 42, 44 can be any elongate beams, bodies, or any other type of elongate structures having lumens defined therein for receiving the extendable legs 48A, 48B. FIGS. 2A, 2B, and 3B best depict the first leg section 48 in its retracted position, while FIGS. 2C, 2D, and 3A best depict the first leg section 48 in its extended position. The second leg section 50 is made up of two legs 50A, 50B, with the first leg 50A coupled at one end to the extendable leg 48A and the second leg 50B coupled at one end to the extendable leg 48B such that the two legs 50A, 50B extend perpendicularly from the two extendable legs 48A, 48B. Further, the two legs 50A, 50B are coupled to each other at the opposite ends thereof, as best shown in FIG. 2A. In addition, the coupling member 34 has a hook 52 coupled to the second leg section 50 at the end of the legs 50A, 50B where the two legs 50A, 50B are coupled to each other, wherein the hook 52 can be used to couple the hook-lift arm 20 to a target object (such as a container) to be loaded onto the hoist 10 via the arm 20.

Figure 2C:
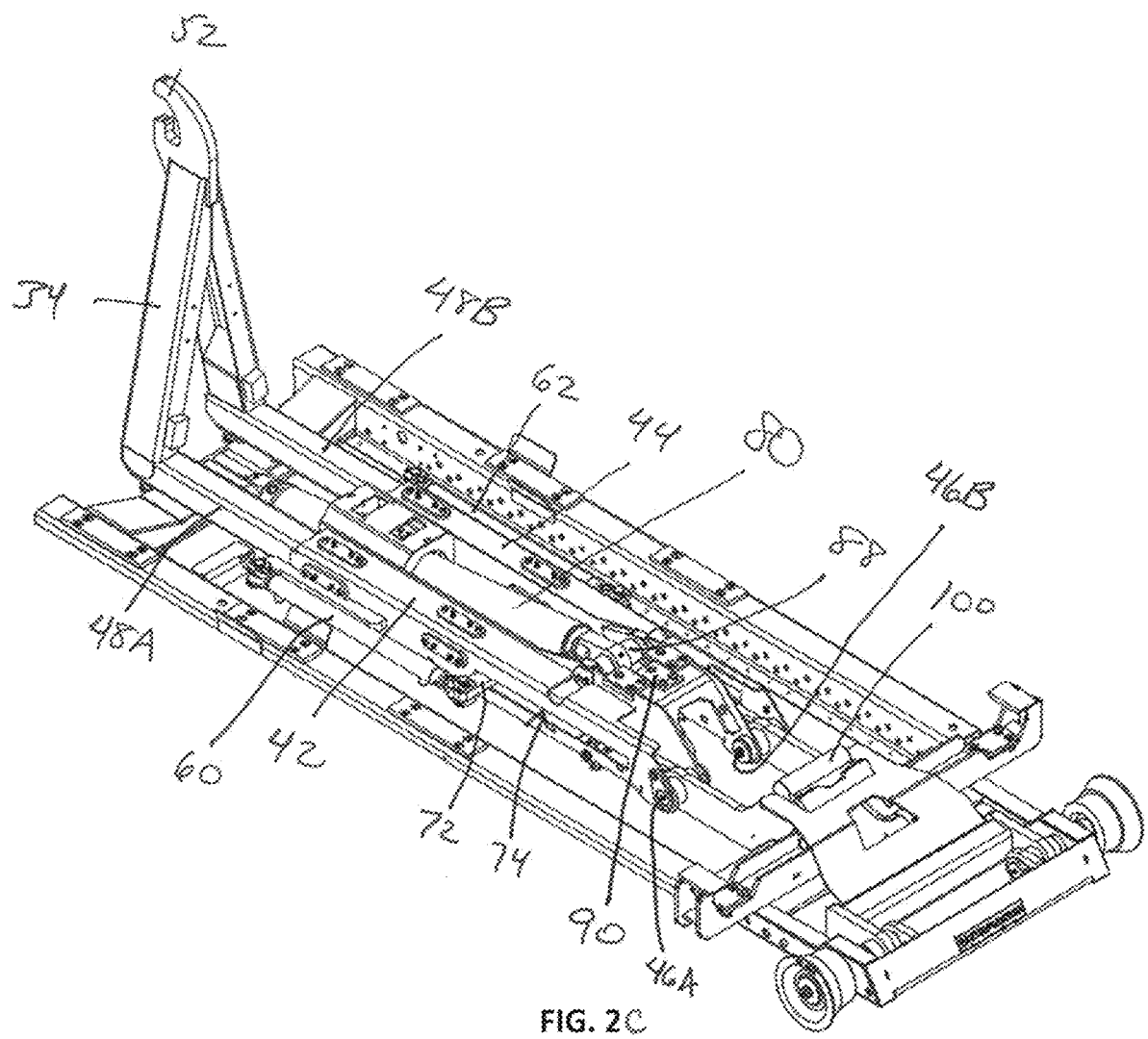
FIG. 2C is a rear perspective view of the hoist apparatus of FIG. 2A in which the arm is disposed in the retracted position, according to one embodiment.
Figure 2D:
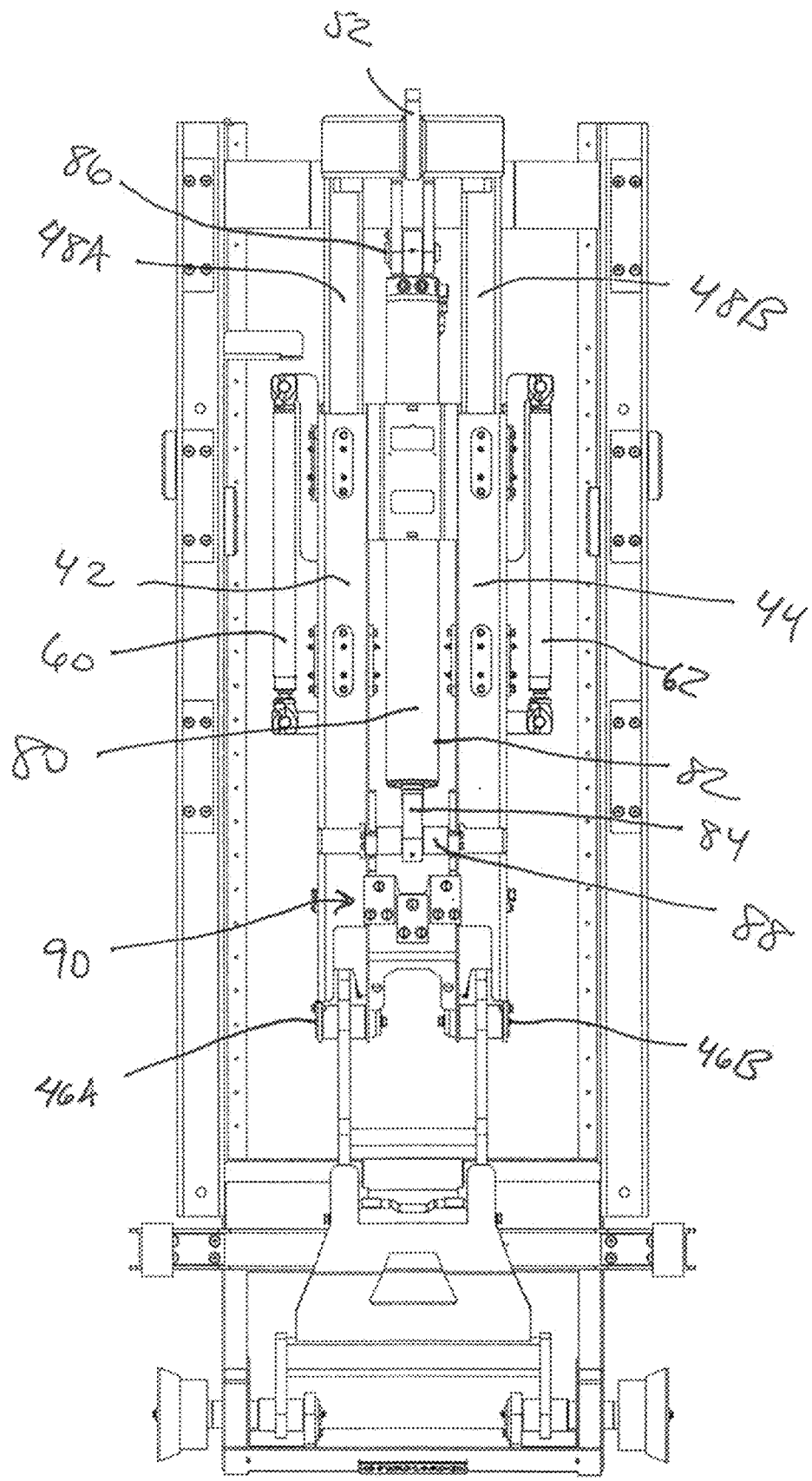
FIG. 2D is a top view of the hoist apparatus of FIG. 2C, according to one embodiment.
Figure 3A:
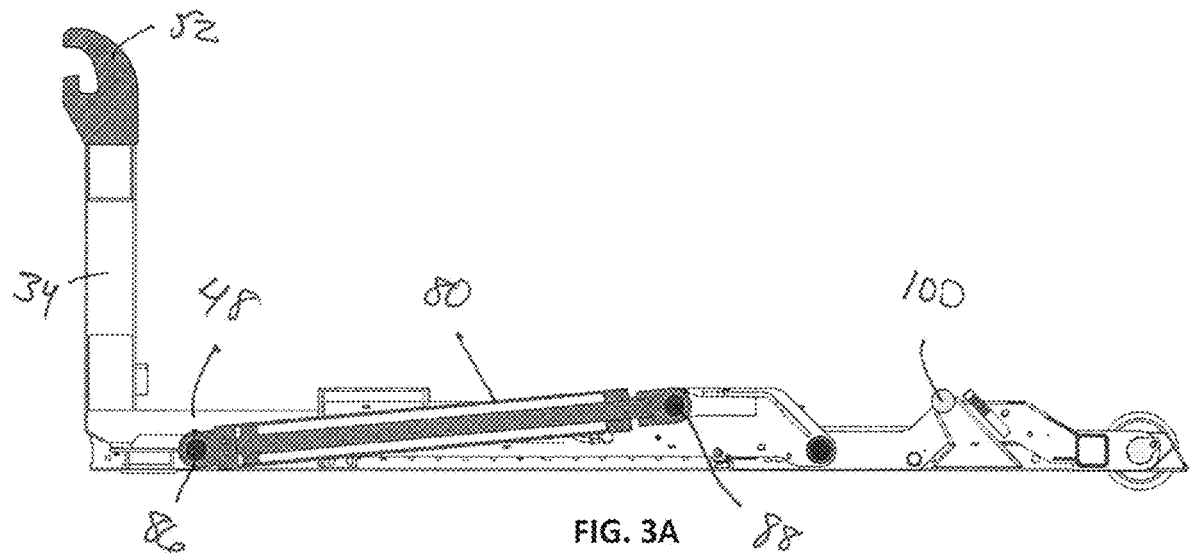
FIG. 3A is a side view of a hoist apparatus in the retracted position, according to one embodiment.
Figure 3B:
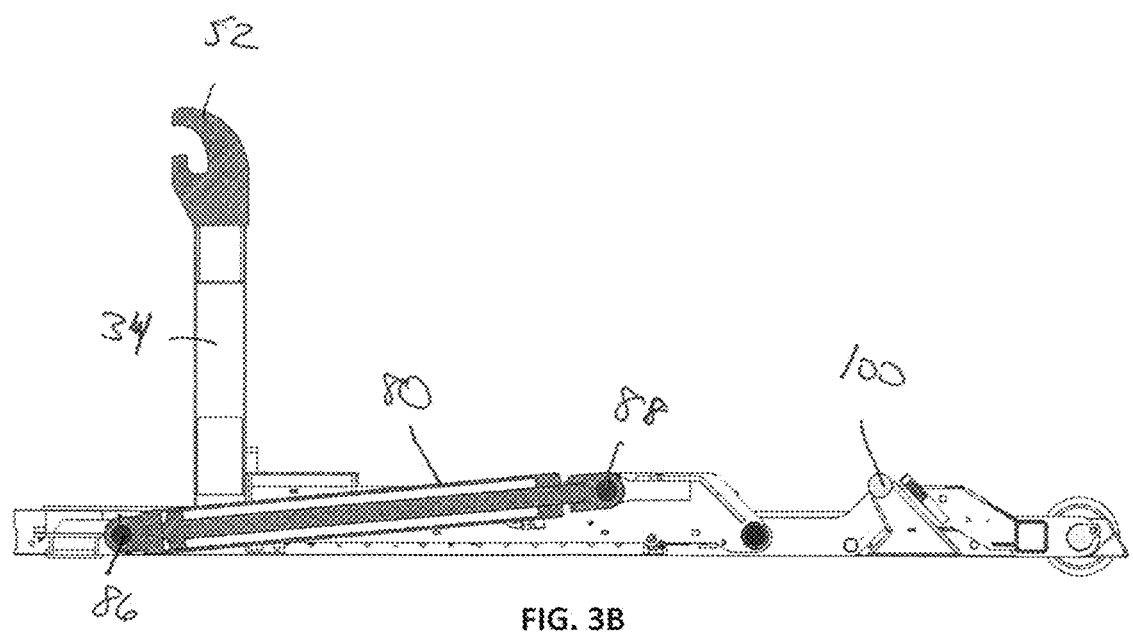
FIG. 3B is a side view of the hoist apparatus of FIG. 3A in which the jib member is disposed in a retracted position, according to one embodiment.

As best shown in FIGS. 2B, 2C, and 2D, the hook-lift arm 20 also has two hydraulic cylinders (also referred to herein as "telescoping" or "extension" cylinders) 60, 62 that are coupled to the extendable legs 48A, 48B of the jib member 34 such that actuation of the telescoping cylinders 60, 62 can cause the extension/retraction of the legs 48A, 48B, thereby extending/retracting the jib member 34. More specifically, the cylinder 60 has a cylinder body 64 and an extendable piston 66, while the cylinder 62 has a cylinder body 68 and an extendable piston 70. As best shown in FIG. 2B, the cylinder body 64 of the cylinder 60 is attached to the elongate leg 42 of the middle segment 32, while the piston 66 is coupled to the extendable leg 48A via a coupling bar 72 that is slidably disposed through a slot 74 in the elongate leg 42. Thus, as shown in FIG. 2B, extension of the piston 66 causes retraction of the extendable leg 48A. Similarly, the cylinder body 68 of the cylinder 62 is attached to the elongate leg 44 of the middle segment 32, while the piston 70 is coupled to the extendable leg 48B via a coupling bar 76 that is slidably disposed through a slot (not shown) in the elongate leg 44. Thus, extension of the piston 70 causes retraction of the extendable leg 48B. Alternatively, retraction of the pistons 66, 70 of the hydraulic cylinders 60, 62 causes extension of the extendable legs 48A, 48B, as best shown in FIG. 2C. Accordingly, the jib member 34 may be extended toward a storage and transport position as best shown in FIGS. 2C, 2D, and 3A such that the jib member 34 is adjacent the cab 16 by retracting the telescoping cylinders 60, 62. Further, the jib member 34 may be retracted into a retracted position as best shown in FIGS. 2A and 3B such that the jib member 34 is adjacent the middle section 32 by extending the telescoping cylinders 60, 62.

Figure 3C:
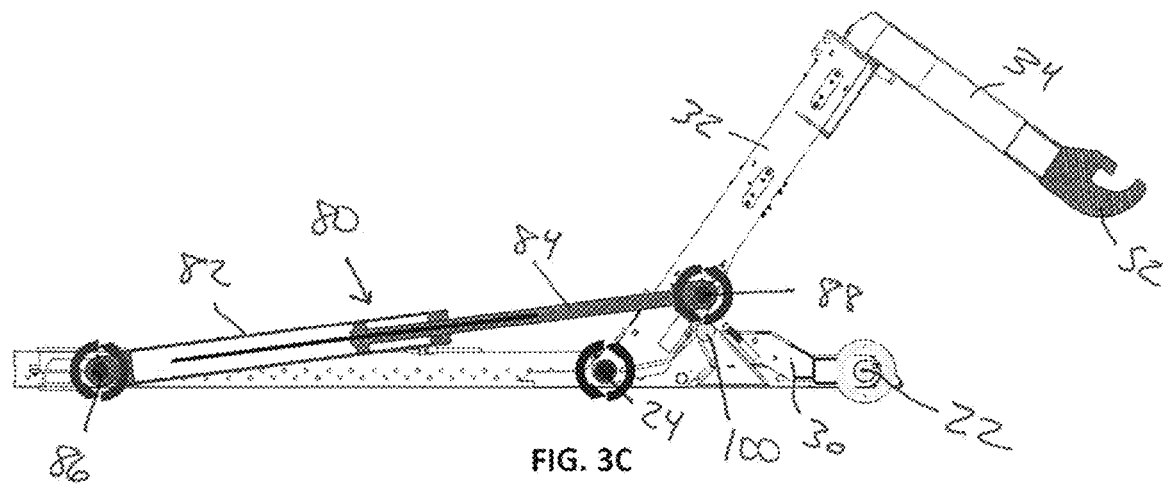
FIG. 3C is a side view of the hoist apparatus of FIG. 3A in which the arm is moving toward the extended position, according to one embodiment.
Figure 3D:
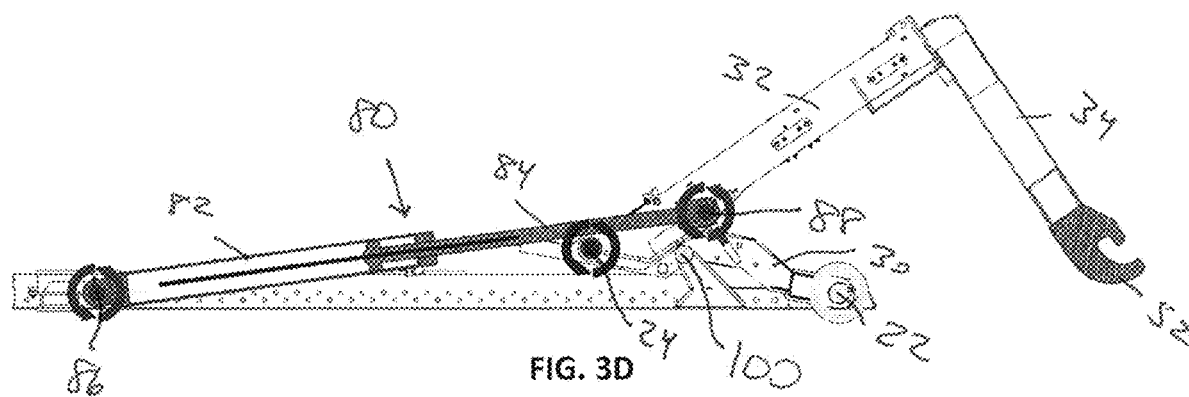
FIG. 3D is a side view of the hoist apparatus of FIG. 3A in which the arm is moving further toward the extended position, according to one embodiment.
Figure 3E:
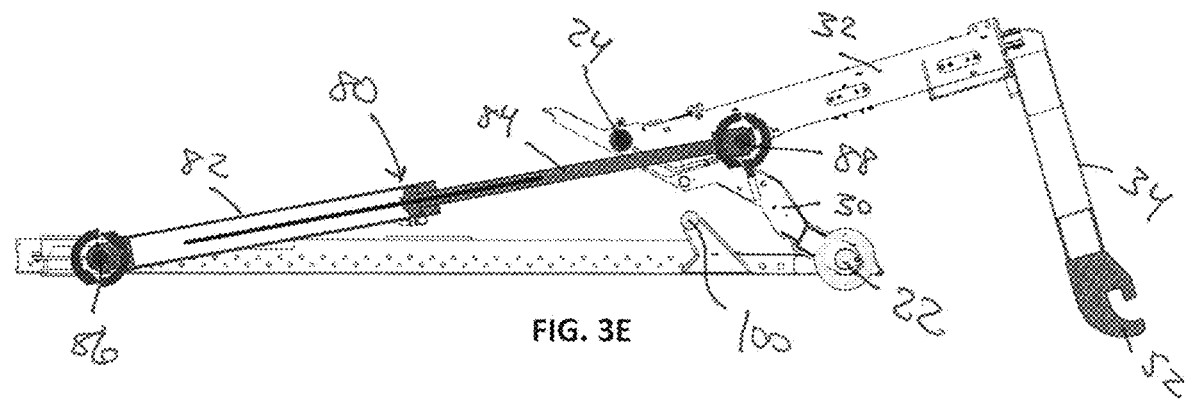
FIG. 3E is a side view of the hoist apparatus of FIG. 3A in which the arm is disposed in the extended position, according to one embodiment.

In addition, as best shown in FIGS. 2C, 2D, and 3A-3E, the hook-lift arm 20 also has a single hydraulic lift cylinder 80 that urges the hook-lift arm 20 between a retracted or resting position on the frame 18 (as best shown in FIGS. 3A and 3B) and an extended or hooking position proximal of the frame 18 (as best shown in FIGS. 1 and 3E). The lift cylinder 80 has a cylinder body 82 and an extendable piston 84 (as best shown in FIGS. 3C-3E). The end of the cylinder body 82 is pivotally coupled to the frame 18 at or near the front of the frame 18 at a rotatable joint (or "pin") 86, while the end of the piston 84 is pivotally coupled to the middle segment 32 at a rotatable joint (or "pin") 88 that is mounted on the middle segment 32 such that the pin 88 extends between and is coupled to the two elongate legs 42, 44. In addition, the middle segment 32 has a contact pad 90 (or, in this specific embodiment, a set of contact pads 90) attached to and disposed between the two elongate legs 42, 44 as best shown in FIGS. 2C and 2D. It is understood that the set of contact pads 90 as shown are made up of three contact pads 90. Alternatively, the middle segment 32 can have one, two, four, or any number of contact pads attached to the two elongate legs 42, 44 as shown. In a further alternative, the middle segment 32 has no contact pads.

Further, as best shown in FIGS. 1, 2B, 2C, and 3A-3E, the frame 18 also has a stationary fulcrum (also referred to as a "contact fulcrum" or "contact base") 100 that is fixedly disposed on the frame 18. More specifically, the fulcrum 100 is disposed on the cross-member 26 of the frame 18, as best shown in FIG. 2B). The fulcrum 100 according to one embodiment has a contract structure 102 disposed on a base or support structure 104 such that the contact structure 102 is disposed at a predetermined distance from the cross-member 26. In one implementation, the contact structure 102 is an elongate member such as a rod or bar. Alternatively, the fulcrum 100 can be any structure that creates a contact point that is disposed at a predetermined distance from the cross-member 26.

During extension/retraction of the lift cylinder 80 as will be described in further detail below, the contact pads 90 of the middle segment 32 (or, alternatively, in the absence of contact pads, the middle segment 32 itself) contact the stationary fulcrum 100. More specifically, the contact pads 90 contact the contact structure 102 of the fulcrum 100. The fulcrum 100 reduces the amount of force required to be generated by the lift cylinder 80 to urge the hook-lift arm 20 between its resting position and its extended position. It is understood that the stationary fulcrum 100 can be any structure that is disposed on the frame 18 in the appropriate position on the frame 18 such that the contact pads 90 makes contact therewith during movement of the hook-lift arm 20 between its resting position and its extended position.

The positioning of the fulcrum 100 on the cross-member 26 results in the cross-member 26 having a dual purpose. First, the cross-member 26 serves as a contact point for the rear member 30. That is, the rear member 30 rests or is disposed on the cross-member 26 when the hoist 10 is being used for loading and offloading (as shown in FIGS. 3A-3C), as well as when the hoist is flat (as shown in FIG. 2C). This first purpose is a fairly standard purpose in known hoists. Second, the fulcrum 100 disposed on the cross-member 26 is the contact point or surface for the middle segment 32 as described above and in additional detail below. This second purpose is the new purpose that results in the dual-purpose nature of the cross-member 26. Thus, the cross-member 26 with the fulcrum 100 disposed thereon is a dual-purpose component that serves as a contact or resting point for two different portions of the hoist 10.

Figure 4A:
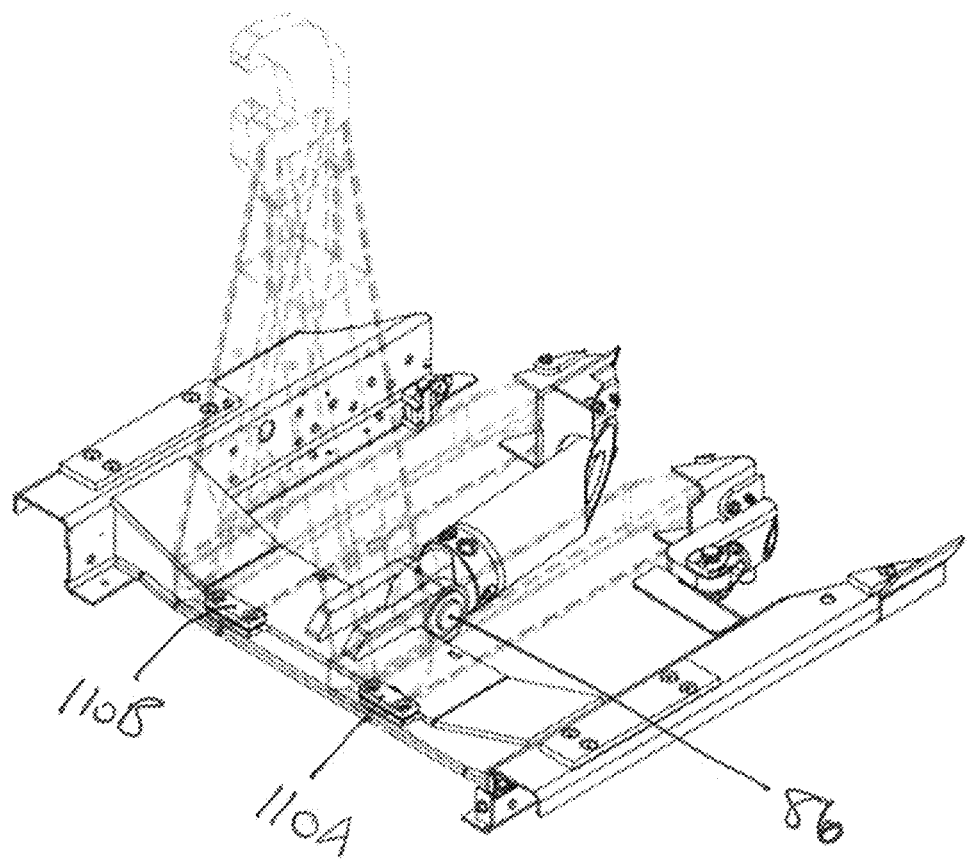
FIG. 4A is a front upper perspective cutaway view of a distal portion of a hoist apparatus, according to one embodiment.
Figure 4B:
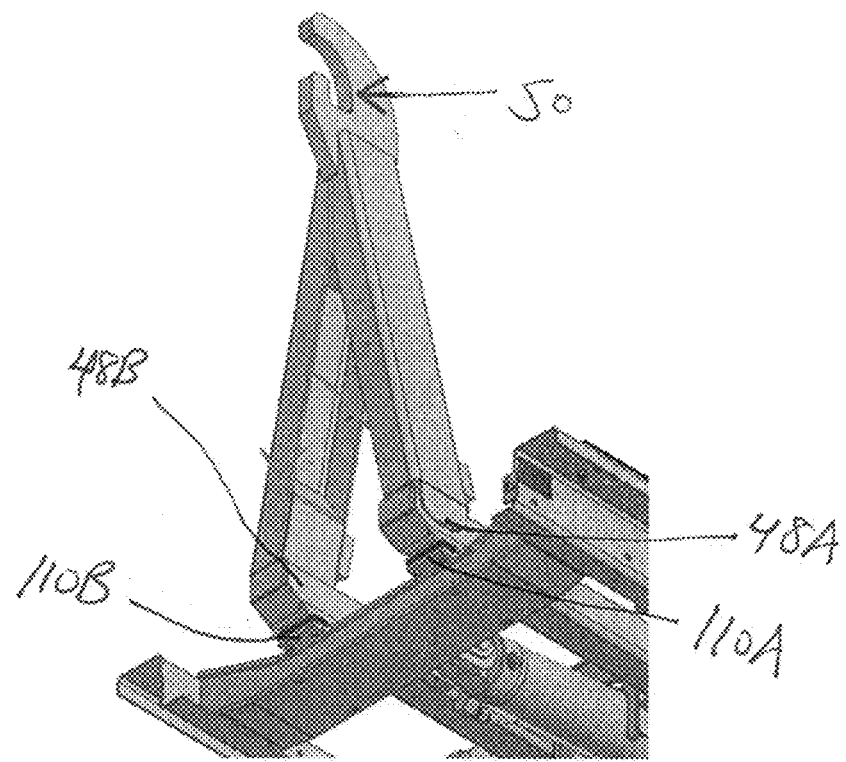
FIG. 4B is front lower perspective cutaway view of the distal portion of the hoist apparatus of FIG. 4A, according to one embodiment.

In certain alternative embodiments, the frame 18 can also have a pair of contact pads 110A, 110B disposed at the front end of the frame 18 as best shown in FIGS. 4A and 4B, according to one embodiment. It is understood that the contact pads 110A, 110B can be any flat or substantially flat structures disposed at the front end of the frame 18 to receive the ends of the extendable legs 48A, 48B when they are in the storage/transport position. According to one implementation, the contact pads 110A, 110B provide stabilization for the jib member 34 in the loaded or extended position. More specifically, the contact pads 110A, 110B provide additional torsional stability in the event of application of a side load to the hoist 10.

The full range of movement of the elements of the hoist 10 is shown in progressive fashion in FIGS. 3A through 3E. More specifically, FIGS. 3A-3E depict the hook-lift arm 20 moving from its resting/storage and transport position (as shown in FIG. 3A) to its extended coupling position (as shown in FIG. 3E) such that the hook-lift arm 20 can be coupled to an object to be loaded onto the hoist 10 (or such that an object previously loaded onto the hoist 10 can be unloaded). In one embodiment, from its resting/transport position of FIG. 3A, the jib member 34 is retracted such that the jib member 34 is adjacent to the middle segment 32 (and the legs 48A, 48B of the jib member 34 are retracted into the elongate legs 42, 44 of the middle segment 32) as shown in FIG. 3B by extending the telescoping cylinders 60, 62 as discussed in detail above. Once the jib member 34 is retracted, the lift cylinder 80 is actuated to extend such that the middle segment 32 rotates in relation to the base segment 30 around the axis 24 until the middle segment 32 (and, more specifically, the contact pads 90 of the middle segment 32) contacts the contact fulcrum 100, as shown in FIG. 3C. Once the middle segment 32 contacts the fulcrum 100, the rotation of the middle segment 32 in relation to the base segment 30 continues while rotation of the base segment 30 in relation to the frame 18 at axis 22 begins, as shown in FIG. 3E. At this point, there is rotation around both axes 22, 24. At a fixed point, the middle section 32 contacts the rear member 30 and rotation about axis 24 ceases. The base segment 30 and middle segment 32 then continue to rotate together in relation to the frame 18 until the hook 52 of the hook-lift arm 20 is disposed at the desired location proximal to the frame 18 such that the hook 52 can be coupled to any target object (such as, for example, a container).

Further, it is understood that the sequence just described is reversed to load a target object onto the hoist.

According to certain embodiments, the fulcrum 100 acts to (1) decrease the amount of force (and thus the hydraulic pressure) required from the lift cylinder 80 to operate the hook-lift arm 20 and/or concurrently (2) reduce the effective area required of the lift cylinder 80 and achieve the same lift capacity. In one embodiment, the force required of the lift cylinder 80 can be reduced by around 15% to about 65% as a result of the use of the fulcrum. Alternatively, the force required can be reduced by about 25% to about 50%. In a specific exemplary embodiment, the force required can be reduced by about 37% as a result of the use of the fulcrum 100. Thus, the presence of the fulcrum 100 on the frame 18 reduces the force requirements such that a single lift cylinder (such as cylinder 80) can be used in place of the at least two lift cylinders of the prior art hoists. As such, the fulcrum 100 allows for the system to maintain or reduce the cycle time, allows the use of electrically operated hydraulic pumps, and reduces the required strength (and thus the required weight and cost) of many structural elements of the lift hoist 10. Stated another way, the geometry of known lift hoists without the fulcrum required two lift cylinders to generate a lift capacity of 10,500 lbs, while the hoist 10 of the current embodiment with the fulcrum 100 as described above can generate a lift capacity of 7,500 lbs with just one of the same lift cylinders.

Although the various embodiments have been described with reference to preferred implementations, persons skilled in the art will recognize that changes may be made in form and detail without departing from the spirit and scope thereof.

What is claimed is:

1. A hoist apparatus comprising:
   (a) a base frame comprising a cross member;
   (b) an arm comprising:
      (i) a base segment rotatably coupled to the base frame at a first joint;
      (ii) a middle segment rotatably coupled to the base segment at a second joint; and
      (iii) coupling segment extendably coupled to the middle segment at a second arm joint, the coupling segment comprising a hook at a distal end of the coupling segment;
   (c) a first hydraulic cylinder rotatably coupled at a first end to the base frame and rotatably coupled at a second end to the middle segment;
   (d) a contact fulcrum attached to the cross member,
   (e) a retracted arm position in which the middle segment is disposed adjacent to and parallel with the base frame;
   (f) an intermediate arm position in which the middle segment is disposed in contact with the contact fulcrum; and (g) an extended arm position in which the middle segment and the coupling segment are at least partially disposed proximal of a proximal end of the base frame.

2. The hoist apparatus of claim 1, wherein the middle segment comprises a pair of elongate tubes.

3. The hoist apparatus of claim 1, wherein the contact fulcrum comprises:
(a) a base structure coupled to the cross member; and
(b) a contact structure coupled to the base structure.

4. The hoist apparatus of claim 3, wherein the middle segment is disposed in contact with the contact structure in the intermediate arm position.

5. The hoist apparatus of claim 1, further comprising at least one second hydraulic cylinder operably coupled at a first end to the middle segment and operably coupled at a second end to the coupling segment, wherein the coupling segment is slidable between a retracted coupling segment position and an extended coupling segment position.

6. The hoist apparatus of claim 1, wherein concurrent rotation around both the first and second joints occurs at the same time during at least a portion of the movement of the arm between the retracted arm and extended arm positions.

7. The hoist apparatus of claim 1, wherein the contact fulcrum reduces the amount of force required from the first hydraulic cylinder during movement of the arm between the retracted arm and extended arm positions.

8. The hoist apparatus of claim 1, further comprising first and second contact pads disposed at a distal end of the base frame, wherein the first and second contact pads are sized and shaped to receive the coupling segment.

9. A hoist apparatus comprising:
(a) a base frame comprising a cross member;
(b) an arm comprising:
(i) a base segment rotatably coupled to the base frame at a first joint;
(ii) a middle segment rotatably coupled to the base segment at a second joint, the middle segment comprising first and second elongate tubes; and
(iii) a coupling segment extendably coupled to the middle segment, the coupling segment comprising a first leg section, a second leg section coupled to the first leg section, and a hook at a distal end of the second leg section, wherein the first leg section comprises a first leg received within the first elongate tube and a second leg received within the second elongate tube;
(c) a hydraulic lift cylinder rotatably coupled at a first end to the base frame and rotatably coupled at a second end to the middle segment;
(d) a contact fulcrum attached to the cross member;
(e) a retracted arm position in which the middle segment is disposed adjacent to and parallel with the base frame;
(f) an intermediate arm position in which the middle segment is disposed in contact with the contact fulcrum; and
(g) an extended arm position in which the middle segment and the coupling segment are at least partially disposed proximal of a proximal end of the base frame.

10. The hoist apparatus of claim 9, wherein the contact fulcrum reduces the amount of force required from the hydraulic lift cylinder during operation of the arm.

11. The hoist apparatus of claim 9, wherein the base segment is contactable with the cross member during operation of the arm.

12. The hoist apparatus of claim 9, wherein concurrent rotation around both the first and second joints occurs at the same time during movement of the arm between a retracted position and an extended position.

13. The hoist apparatus of claim 9, further comprising first and second hydraulic extension cylinders operably coupled at a first end to the middle segment and operably coupled at a second end to the coupling segment, wherein the coupling segment is slidable between a retracted coupling segment position and an extended coupling segment position.

14. A hoist apparatus comprising:
(a) a base frame comprising a cross member;
(b) an arm comprising:
(i) a base segment rotatably coupled to the base frame at a first joint;
(ii) a middle segment rotatably coupled to the base segment at a second joint, the middle segment comprising a contact pad; and
(iii) a coupling segment extendably coupled to the middle segment, the coupling segment comprising a hook at a distal end of the coupling segment;
(c) a first hydraulic cylinder rotatably coupled at a first end to the base frame and rotatably coupled at a second end to the middle segment;
(d) a contact fulcrum attached to the cross member,
(e) a retracted arm position in which the middle segment is disposed adjacent to and parallel with the base frame;
(f) an intermediate arm position in which the middle segment is disposed in contact with the contact fulcrum; and
(g) an extended arm position in which the middle segment and the coupling segment are at least partially disposed proximal of a proximal end of the base frame,
wherein the contact fulcrum comprises
(a) a base structure coupled to the base frame, and
(b) a contact structure coupled to the base structure; and
wherein the contact pad of the middle segment is in contact with the contact structure in the intermediate arm position.

15. The hoist apparatus of claim 14, wherein the base frame is disposed on a wheeled chassis.

16. The hoist apparatus of claim 14, wherein the base segment is disposed against the cross member in the retracted arm position.

17. The hoist apparatus of claim 14, wherein the base segment comprises first and second coupling arms rotatably coupled to the middle segment at the second joint, wherein the base structure and the contact structure of the contact fulcrum are positioned between the first and second coupling arms in the retracted arm position.

18. The hoist apparatus of claim 14, wherein the base structure positions the contact structure higher above the base frame than the first joint.

19. The hoist apparatus of claim 14, further comprising at least one second hydraulic cylinder operably coupled at a first end to the middle segment and operably coupled at a second end to the coupling segment, wherein the coupling segment is slidable between a retracted coupling segment position and an extended coupling segment position.

20. The hoist apparatus of claim 14, wherein the contact fulcrum reduces the amount of force required from the first hydraulic cylinder during movement of the arm between the retracted arm and extended arm positions.

21. The hoist apparatus of claim 14, wherein concurrent rotation around both the first and second joints occurs at the same time during at least a portion of the movement of the arm between the retracted arm and extended arm positions.

22. The hoist apparatus of claim 14, wherein the contact structure comprises a bar.

* * * * *